(12) United States Patent
Matsuda et al.

(10) Patent No.: US 8,377,601 B2
(45) Date of Patent: Feb. 19, 2013

(54) DIRECT OXIDATION FUEL CELL

(75) Inventors: Hiroaki Matsuda, Osaka (JP); Hideyuki Ueda, Osaka (JP); Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 730 days.

(21) Appl. No.: 12/498,759

(22) Filed: Jul. 7, 2009

(65) Prior Publication Data

US 2010/0009229 A1 Jan. 14, 2010

(30) Foreign Application Priority Data

Jul. 14, 2008 (JP) ................................ 2008-183011

(51) Int. Cl.
*H01M 8/06* (2006.01)
(52) U.S. Cl. ........................ 429/424; 429/523
(58) Field of Classification Search ................... 429/424
See application file for complete search history.

(56) References Cited

U.S. PATENT DOCUMENTS

2006/0127707 A1* 6/2006 Terada et al. .................... 429/12
2007/0264552 A1* 11/2007 Hayamizu et al. ............. 429/30

FOREIGN PATENT DOCUMENTS

JP 2002-110191 4/2002

* cited by examiner

*Primary Examiner* — Ula C Ruddock
*Assistant Examiner* — Jacob Marks
(74) *Attorney, Agent, or Firm* — McDermott Will & Emery LLP (57) ABSTRACT

The direct oxidation fuel cell of the present invention is provided with: a membrane electrode assembly including an anode, a cathode, and an electrolyte membrane interposed between the anode and the cathode; an anode-side separator having a fuel flow channel for supplying fuel to the anode; and a cathode-side separator having an oxidant flow channel for supplying oxidant to the cathode, in which the anode includes an anode catalyst layer disposed at the side of the electrolyte membrane and an anode diffusion layer disposed at the side of the anode-side separator. The anode diffusion layer includes a water repellent layer disposed at the side of the anode catalyst layer and including a first conductive agent and a first water repellent agent; and a substrate layer disposed at the side of the anode-side separator, and the porosity of the substrate layer is higher at the downstream side than at the upstream side of the fuel flow.

12 Claims, 3 Drawing Sheets

DIRECT OXIDATION FUEL CELL

FIELD OF THE INVENTION

The present invention relates to a direct oxidation fuel cell, and particularly relates to the improvement of the structure of an anode diffusion layer.

BACKGROUND OF THE INVENTION

With higher performance achieved in mobile devices such as cell phones, laptop computers, and digital cameras, being anticipated for the power source is the practical use of fuel cells using a solid polymer electrolyte membrane. Among solid polymer fuel cells (hereinafter, simply referred to as "fuel cell"), direct oxidation fuel cells, in which fuel such as methanol is directly supplied to the anode, are well-suited in terms of reducing size and weight, and thus, their development as a power source for mobile devices is currently underway.

A fuel cell is provided with a membrane electrode assembly (MEA). The membrane electrode assembly is composed of: a polymer electrolyte membrane; and an anode (a fuel electrode) and a cathode (an air electrode) that are bonded to each side thereof, respectively. The anode is composed of an anode catalyst layer and an anode diffusion layer, and the cathode is composed of a cathode catalyst layer and a cathode diffusion layer. The MEA is interposed between a pair of separators, thus constituting a cell. An anode-side separator has a fuel flow channel for supplying fuel such as hydrogen and methanol to the anode. A cathode-side separator has an oxidant flow channel for supplying oxidant such as oxygen and air to the cathode.

There are some goals with respect to putting a direct oxidation fuel cell into practical use.

First of these is long life characteristics. In a fuel cell, output power gradually becomes lower as time elapses for power generation. For example, a power source for a mobile device is required to maintain output power for a total of 5000 hours or more; currently however, long life characteristics have not yet been achieved to such an extent.

There are some factors that cause output power degradation. First of these is a phenomenon called methanol crossover (MCO) in which fuel such as methanol supplied to the anode permeates through the electrolyte membrane and travels to the cathode. Since MCO lowers the cathode potential, output power of the fuel cell degrades. Also, methanol that has reached the cathode after permeating through the electrolyte membrane then reacts with air. This reaction causes excessive air consumption leading to air deficiency at the downstream side, and thus causes output power of the fuel cell to degrade. The amount of MCO tends to increase as time for power generation elapses, and is assumed to affect life characteristics.

In order to reduce MCO, reducing methanol diffusivity in the anode diffusion layer is considered effective. However, if methanol diffusivity is reduced in the entire anode, methanol becomes deficient at the downstream side of the fuel flow, thus causing output power to degrade.

In view of the problems mentioned above, a proposal is made to increase the methanol permeability coefficient of the anode diffusion layer so that the more downstream the fuel flow, the larger the coefficient (Patent Document 1). This enables the supply amount of methanol to be secured at the downstream side of the fuel flow, while also reducing MCO at the upstream side thereof. Specifically, a proposal is made to allow change in the composition and the thickness of the conductive water repellent layer included in the anode diffusion layer, at the upstream side and the downstream side of the fuel flow. The conductive water repellent layer includes a conductive agent and a water repellent agent.

[Patent Document 1] Japanese Laid-Open Patent Publication No. 2002-110191

Patent Document 1 proposes that changes be allowed in the composition and the thickness of the conductive water repellent layer included in the anode diffusion layer; however, sufficient effects cannot be achieved by such means, and achievement has not yet been made to the extent of enabling long life characteristics that are satisfactory. There are two reasons to the above, based on the characteristics of a conductive water repellent layer.

First, a conductive water repellent layer usually has a thickness of only about 50 μm. Therefore, even if the composition and the like of the conductive water repellent layer are changed, it is difficult to significantly change the permeability of fuel such as methanol. Particularly, in the case of a high fuel concentration, the fuel permeability with respect to the conductive water repellent layer becomes entirely high. Therefore, in the case of a thin conductive water repellent layer, it is difficult to achieve an effect of changing fuel permeability.

In addition, a conductive water repellent layer serves to bond the diffusion layer and the catalyst layer together, while also serving to control fuel diffusion. If the composition and the thickness of the conductive water repellent layer change significantly, the bonding strength between the diffusion layer and the catalyst layer becomes easily deteriorated. Thus, it becomes difficult to secure conductivity, and further, to control the fuel diffusivity in the entire anode.

Given the above, an object of the present invention is to provide a direct oxidation fuel cell with reduced MCO and improved long life characteristics even when using an aqueous methanol solution containing a high concentration of methanol which is highly diffusive, by controlling fuel diffusivity in the anode.

BRIEF SUMMARY OF THE INVENTION

The direct oxidation fuel cell of the present invention is provided with: a membrane electrode assembly including an anode, a cathode, and an electrolyte membrane interposed between the anode and the cathode; an anode-side separator having a fuel flow channel for supplying fuel to the anode; and a cathode-side separator having an oxidant flow channel for supplying oxidants to the cathode. The anode includes an anode catalyst layer disposed at the side of the electrolyte membrane and an anode diffusion layer disposed at the side of the anode-side separator. The anode diffusion layer includes: a conductive water repellent layer disposed at the side of the anode catalyst layer and including a first conductive agent and a first water repellent agent; and a substrate layer disposed at the side of the anode-side separator. The porosity of the substrate layer is higher at the downstream side of the fuel flow than at the upstream side thereof.

The substrate layer preferably includes a conductive porous material and a second water repellent agent. The content of the second water repellent agent included in the substrate layer is preferably lower at the downstream side than at the upstream side of the fuel flow.

Alternatively, the substrate layer preferably includes a conductive porous material and a second conductive agent. The content of the second conductive agent included in the substrate layer is preferably lower at the downstream side than at the upstream side of the fuel flow.

The porosity of the substrate layer preferably gradually becomes higher from the upstream side toward the downstream side of the fuel flow.

The composition and the thickness of the conductive water repellent layer are preferably entirely uniform from the upstream side to the downstream side of the fuel flow.

The fuel permeability coefficient of the conductive water repellent layer is preferably entirely uniform from the upstream side to the downstream side of the fuel flow.

The fuel is preferably methanol, and an aqueous methanol solution with a methanol concentration of 2 mol/L to 8 mol/L preferably passes through the fuel flow channel.

The porosity at the downstream side of the substrate layer is preferably 1.2 to 2 times more than the porosity at the upstream side thereof.

The thickness of the substrate layer is preferably 5 to 20 times more than the thickness of the conductive water repellent layer.

According to the present invention, MCO can be reduced at the upstream side of the fuel flow and the supply amount of methanol can be secured at the downstream side thereof. Since the output power degradation due to MCO and the output power degradation due to supply amount deficiency of methanol can both be controlled, long life characteristics of the fuel cell improve significantly.

In addition, control of fuel diffusivity is easier when controlled at the substrate layer than at the conductive water repellent layer. Therefore, methanol diffusivity can be controlled at the upstream side and the downstream side of the fuel flow, even when using an aqueous methanol solution containing a high concentration of methanol which is highly diffusive. The use of an aqueous methanol solution with high concentration methanol enables the fuel cell to be lighter or smaller.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A fuel cell of the present invention is provided with: a membrane electrode assembly including an anode, a cathode, and an electrolyte membrane interposed between the anode and the cathode; an anode-side separator having a fuel flow channel for supplying fuel to the anode; and a cathode-side separator having an oxidant flow channel for supplying oxidants to the cathode. The anode includes an anode catalyst layer disposed at the side of the electrolyte membrane and an anode diffusion layer disposed at the side of the anode-side separator. The anode diffusion layer includes: a conductive water repellent layer disposed at the side of the anode catalyst layer and including a first conductive agent and a first water repellent agent; and a substrate layer disposed at the side of the anode-side separator.

The porosity of the substrate layer is higher at the downstream side than at the upstream side of the fuel flow. This is a kind of state, for example, in which the porosity at the downstream side of the substrate layer is 1.2 to 2 times more than the porosity at the upstream side thereof.

In order to reduce MCO and improve long life characteristics, it is effective to control the porosity of the substrate layer included in the anode diffusion layer.

A conductive water repellent layer usually has a thickness of about 50 μm. For the conductive water repellent layer of such thinness, even if the thickness and the composition are changed, control of fuel diffusivity would be difficult. In contrast, a substrate layer usually has a thickness of about 200 to 300 μm. For the substrate layer of such sufficient thickness, changing the thickness and the composition would enable effective control of fuel diffusivity. In this manner, MCO can be suppressed at the upstream side of the fuel flow, and the supply amount of methanol can be secured at the downstream side thereof. Since control is possible for both output power degradations, one due to MCO and the other due to supply amount deficiency of methanol, improvement in long life characteristics of the fuel cell is made possible.

Figure 1:
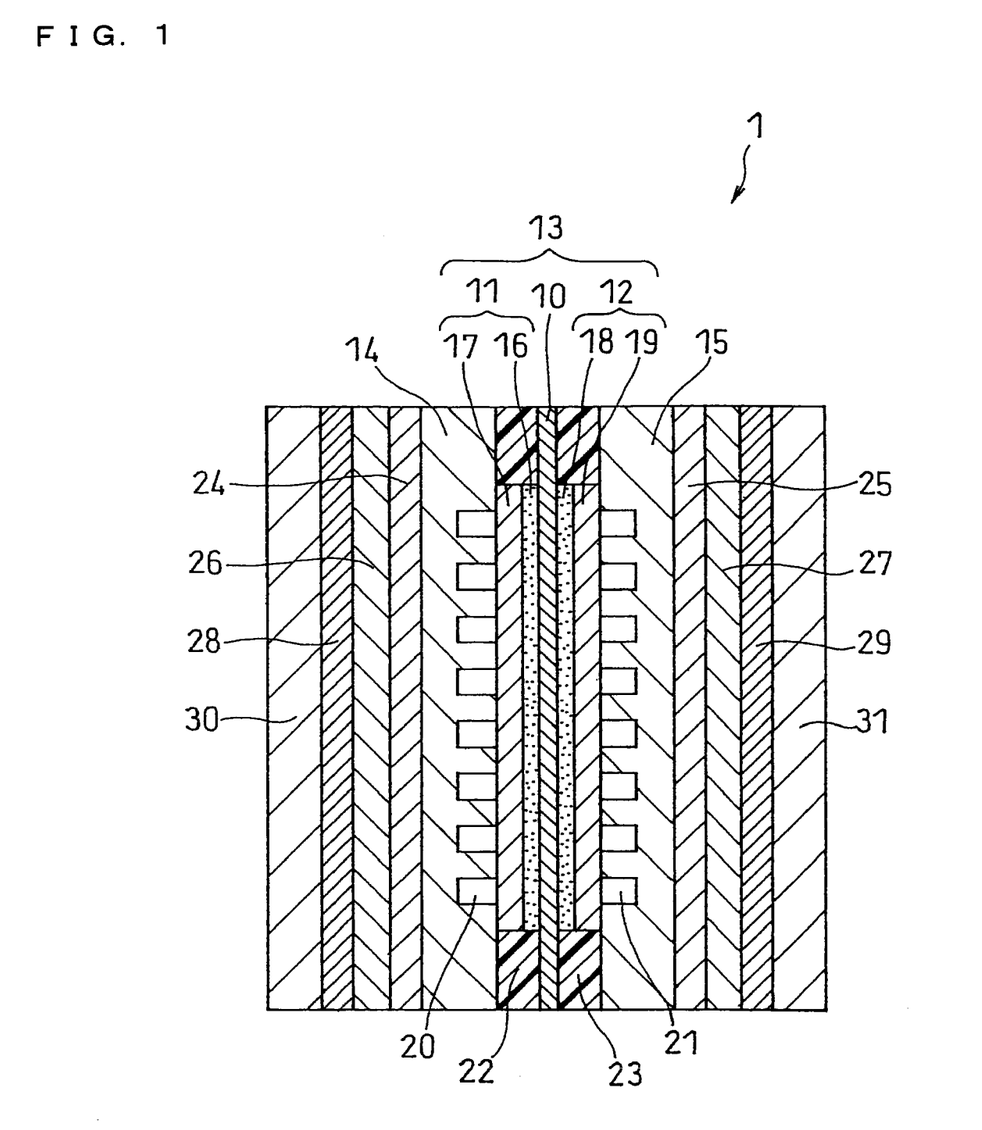
FIG. 1 is a vertical sectional view schematically illustrating an example of a direct oxidation fuel cell of the present invention.
Figure 2:
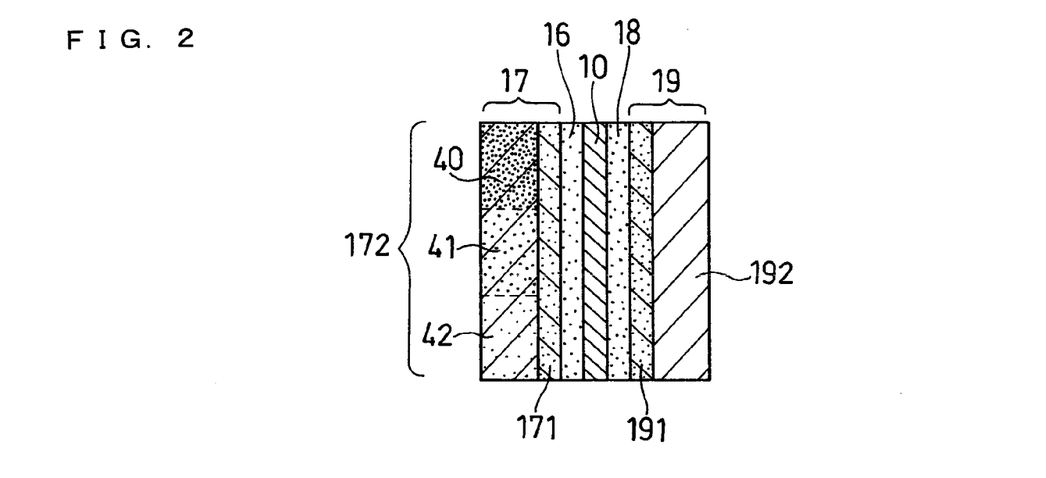
FIG. 2 is an enlarged view schematically illustrating a relevant part of a direct oxidation fuel cell illustrated in FIG. 1.

The direct oxidation fuel cell will be explained with reference to figures. FIG. 1 is a vertical sectional view schematically illustrating a structure of a cell in a direct oxidation fuel cell. FIG. 2 is an enlarged view schematically illustrating a relative part of the direct oxidation fuel cell illustrated in FIG. 1. The direct oxidation fuel cell is provided with: a membrane electrode assembly (MEA) 13 including an anode 11, a cathode 12, and an electrolyte membrane 10 interposed between the anode 11 and the cathode 12. Gaskets 22 and 23 are disposed on the peripheral side faces of the membrane electrode assembly 13. The membrane electrode assembly 13 is sandwiched between an anode-side separator 14 and a cathode-side separator 15. The anode-side separator 14 has a fuel flow channel 20 for supplying fuel to the anode 11. The cathode-side separator 15 has an oxidant flow channel 21 for supplying oxidant to the cathode 12.

The anode 11 includes an anode catalyst layer 16 disposed at the side of the electrolyte membrane 10 and an anode diffusion layer 17 disposed at the side of the anode-side separator 14. The anode diffusion layer 17 includes a conductive water repellent layer 171 disposed at the side of the anode catalyst layer 16 and a substrate layer 172 disposed at the side of the anode-side separator 14.

The cathode 12 includes a cathode catalyst layer 18 disposed at the side of the electrolyte membrane 10 and a cathode diffusion layer 19 disposed at the side of the cathode-side separator 15. The cathode diffusion layer 19 includes a conductive water repellent layer 191 disposed at the side of the cathode catalyst layer 18 and a substrate layer 192 disposed at the side of the cathode-side separator 15.

The direct oxidation fuel cell may be fabricated in the following manner, for example. The membrane electrode assembly 13 is fabricated by bonding the anode 11 and the cathode 12 with the electrolyte membrane 10 interposed therebetween by means such as hot pressing.

The obtained membrane electrode assembly 13, whose peripheral side faces have been sealed with gaskets 22 and 23, are sandwiched between the anode-side separator 14 and the cathode-side separator 15, and then further sandwiched between: current collecting plates 24 and 25; heaters 26 and 27; insulating plates 28 and 29; and end plates 30 and 31. Thus integrated, a fuel cell 1 is obtained.

The anode diffusion layer includes a substrate layer and a conductive water repellent layer. The conductive water repellent layer includes a first conductive agent and a first water repellent agent. The composition and the thickness of the conductive water repellent layer are preferably entirely uniform from the upstream side to the downstream side of the fuel flow. Due to this, the bonding strength between the catalyst layer and the diffusion layer can be secured, and output power degradation due to conductivity degradation and such can be suppressed. Specifically, the weight ratio of (the first conductive agent)/(the first water repellent agent) at the upstream side is preferably 80 to 120% of the weight ratio of (the first conductive agent)/(the first water repellent agent) at the downstream side. Also, the thickness of the conductive water repellent layer at the upstream side of the fuel flow is preferably 80 to 120% of the thickness at the downstream side thereof. If the thickness at the upstream side of the fuel flow becomes less than 80% or more than 120% of the thickness of the downstream side thereof, the bonding strength between the catalyst layer and the diffusion layer may become insufficient.

Fuel diffusivity can be changed, also by controlling the composition and the thickness of the conductive water repellent layer. However, as mentioned above, since the conductive water repellent layer is thin, the effect of improving fuel diffusivity is smaller compared to the case of controlling the porosity of the substrate layer. Further, if the composition and the thickness of the conductive water repellent layer are not uniform, the bonding strength between the catalyst layer and the diffusion layer become insufficient and cell characteristics may deteriorate. Therefore, the composition and the thickness of the conductive water repellent layer are preferably entirely uniform from the upstream side to the downstream side of the fuel flow.

The substrate layer will be explained. The porosity of the substrate layer is higher at the downstream side than at the upstream side of the fuel flow. That is, the porosity changes in the face direction of the substrate layer. The porosity of the substrate layer can be changed continuously from upstream to downstream of the fuel flow, or can be changed gradually. In particular, when the porosity of the substrate layer is gradually changed, the process for producing the substrate layer is facilitated, and thus, the porosity of the substrate layer becomes easier to control. The porosity of the substrate layer is preferably changed in 2 to 10 stages, and more preferably changed in 2 to 5 stages.

Figure 3:
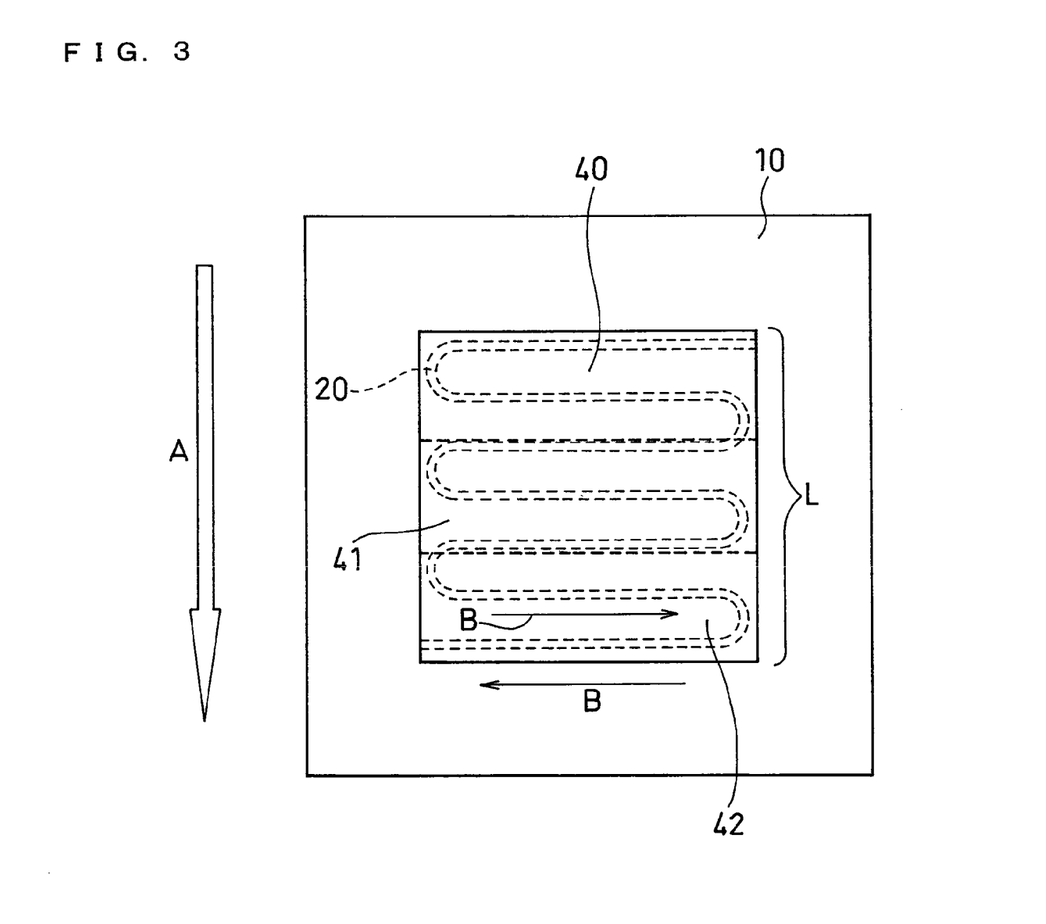
FIG. 3 is a top plan view of an example of an anode-side separator in a direct oxidation fuel cell, seen from a normal direction.

The upstream side and the downstream side of the fuel flow will be explained with reference to a figure. FIG. 3 is a top plan view of an example of an anode-side separator in a fuel cell, seen from a normal direction. As the direction of the fuel flow: the direction from the inlet side of the fuel to the outlet side thereof (the direction of the entire flow); and the direction parallel to the fuel flow channel (the direction of the local flow) can be considered. For example, when the fuel flow channel is of a serpentine type as illustrated in FIG. 3, there is a difference between: the direction of the entire flow from the upstream side toward the downstream side of the fuel flow channel 20 (arrow A); and the direction of the local flow of the fuel flow channel 20 (arrow B). In the present invention, the porosity of the substrate layer is preferably changed by setting the upstream side and the downstream side of the fuel flow based on the direction of the entire fuel flow. This facilitates the process for producing the substrate layer, and thus, the porosity of the substrate layer becomes easier to control. In the following, a case will be explained where the porosity of the substrate layer is changed by setting the upstream side and the downstream side of the fuel flow based on the direction of the entire fuel flow. However, it should be noted that in the present invention, the porosity of the substrate layer may also be changed by setting the upstream side and the downstream side of the fuel flow based on the direction of the local fuel flow.

An upstream portion 40 of the anode diffusion layer 17 faces the upstream side of the fuel flow channel 20. When "L" is the length of the anode diffusion layer 17 parallel to the direction of the entire fuel flow from the upstream side toward the downstream side of the fuel flow channel 20 (arrow A), the length of the upstream portion 40 of the anode diffusion layer 17 parallel to the direction of the arrow A is preferably L/1.5 to L/5.

A downstream portion 42 of the anode diffusion layer 17 faces the downstream side of the fuel flow channel. The length of the downstream side 42 of the anode diffusion layer 17 parallel to the direction of the arrow A is preferably L/1.5 to L/5.

A midstream portion 41 may be in between the upstream portion and the downstream portion. The midstream portion 41 may be of only one area having uniform porosity, or may include a plurality of areas differing in porosity. When the midstream portion is of only one area, the porosity of the upstream portion, the midstream portion, and the downstream portion preferably gradually become higher from the upstream side toward the downstream side of the fuel flow. When the midstream portion includes a plurality of areas differing in porosity, the porosity of the upstream portion, the plurality of areas of the midstream portion, and the downstream portion preferably gradually become higher from the upstream side toward the downstream side of the fuel flow. The length of the midstream portion 41 parallel to the direction of the arrow A is preferably L/1.5 to L/5.

The method for increasing the porosity of the substrate layer at the downstream side than at the upstream side of the fuel flow is not particularly limited. For example, methods can be given, such as: a method in which a second water repellent agent and a second conductive agent are included in the substrate layer and then those contents are changed in the face direction thereof; a method in which a conductive porous material with a basis weight changing in the face direction thereof is made to be the substrate layer; and a method in which a conductive porous material with a thickness changing in the face direction is compressed to a uniform thickness and thus made to be the substrate layer. In particular, when the second water repellent agent and the second conductive agent are included in the substrate layer and those contents are changed in the face direction thereof, the process for producing the substrate layer is facilitated and the porosity becomes easier to control.

When the substrate layer includes the conductive porous material and the second water repellent agent, the content of the second water repellent agent included therein is made lower at the downstream side than at the upstream side of the fuel flow. Due to this, the porosity of the substrate layer can be made higher at the downstream side than at the upstream side of the fuel flow, and thus, fuel diffusivity can be controlled effectively.

The content of the second water repellent agent in the entire substrate layer is preferably 6 wt % to 60 wt %. If the content of the second water repellent agent is less than 6 wt %, fuel diffusivity may not be sufficiently controlled. If the content of the second water repellent agent exceeds 60 wt %, the electronic conductivity of the substrate layer may deteriorate. The content of the second water repellent agent is preferably 30 to 65 wt % at the upstream side and 3 to 30 wt % at the downstream side of the fuel flow in the substrate layer.

The porosity of the entire substrate layer is preferably 40 to 82%, and the porosity is preferably 35 to 65% at the upstream side and 70 to 85% at the downstream side of the fuel flow.

For the porosity, first, a bulk density "d" is obtained from the apparent volume and the weight of the substrate layer. The porosity can be obtained with the formula below, by using: the bulk density "d"; a real density "$D_1$" and a content "$X_1$" of the conductive porous material; a real density "$D_2$" and a content "$X_2$" of the second water repellent agent; and a real density "$D_3$" and a content "$X_3$" of the second conductive agent.

$$100 - d \times (X_1/D_1 + X_2/D_2 + X_3/D_3) \qquad \text{Formula (1)}$$

The first water repellent agent and the second water repellent agent are not particularly limited, and for example, materials usually used in the fuel cell field can be used without any particular limitation. Specifically, for example, fluorocarbon resin is preferably used. For the fluorocarbon resin, polytetrafluoroethylene (PTFE), tetrafluoroethylene-hexafluoropropylene copolymer (FEP), tetrafluoroethylene-perfluoroalkylvinylether copolymer, tetrafluoroethylene-ethylene copolymer, and polyvinylidene fluoride can be given. In particular, PTFE and FEP are preferable. For each of the first water repellent agent and the second water repellent agent, only one of the above may be used alone, or two or more of the above may be used in a combination. The first water repellent agent and the second water repellent agent may be of the same or be different.

In order to include the second water repellent agent in the substrate layer, for example, a dispersion in which the second water repellent agent is dispersed in a dispersion medium is impregnated in the conductive porous material. Subsequently, the dispersion medium may be removed by drying. For the dispersion medium, water and alcohol can be given. In this case, in order to make the content of the second water repellent agent lower at the downstream side than at the upstream side of the fuel flow, the conditions under which the second water repellent agent is impregnated may be gradually or continuously changed from the upstream side toward the downstream side of the fuel flow.

When immersing the conductive porous material into the dispersion in which the second water repellent agent is dispersed, for example, the conductive porous material is divided into two areas: the upstream portion and the downstream portion of the fuel flow. Subsequently, the areas other than where the dispersion is to be applied are masked. Next, the dispersion is applied to the areas that are not masked. This method enables the conditions under which the second water repellent agent is impregnated to be gradually changed.

Specifically, the conductive porous material, whose downstream portion is masked, is immersed in the water repellent agent dispersion so that the second water repellent agent is included in the upstream portion. Then, the conductive porous material, whose upstream portion is masked, is successively immersed in a water repellent agent dispersion that differs in concentration from the one that was included in the upstream portion, followed by drying. The content of the second water repellent agent can be controlled in this manner. Here, the case of dividing the conductive porous material into two areas was explained; however, it may also be divided into three areas: the upstream portion, the midstream portion, and the downstream portion of the fuel flow. Further, the conductive porous material may also be divided into four or more areas. In such a case, the content of the second water repellent agent is gradually made lower from the upstream portion toward the downstream portion.

Other than the above, a drop device, a spray coating device, and the like may also be used to impregnate the second water repellent agent into the substrate layer. In such a case, a gradual or a continuous change is made to the concentration of the water repellent agent dispersions, or the number of times the impregnation treatment is performed is changed.

Figure 4:
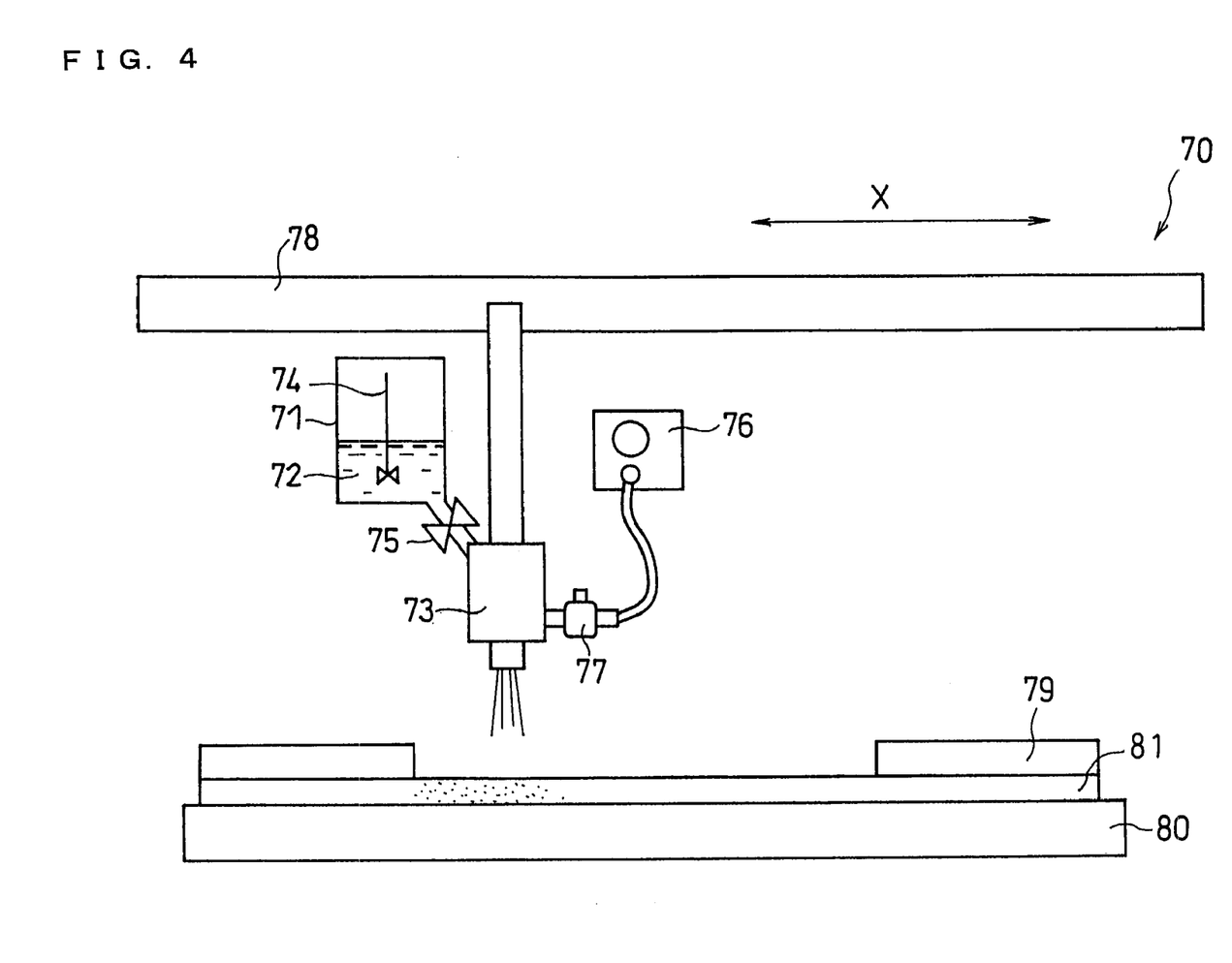
FIG. 4 is a side view schematically illustrating a constitution of a spray coating device.

The case of using a spray coating device will be explained with reference to a figure. FIG. 4 is a side view schematically illustrating a constitution of a spray coating device.

A spray coating device 70 is provided with: a tank 71 containing a dispersion 72; and a spray gun 73 that discharges the dispersion 72.

In the tank 71, the dispersion 72 is stirred by a stirrer 74 and is always in a flowing state. The dispersion 72 is supplied to the spray gun 73 via an open-close valve 75, and is discharged from the spray gun 73 together with a jet of gas. The jet of gas is supplied to the spray gun 73 via a gas pressure adjuster 76 and a gas flow amount adjuster 77. For the jet of gas, for example, nitrogen gas can be used. In the coating device 70, the surface temperature of a conductive porous material 81 is controlled by a heater 80 disposed in contact with the conductive porous material 81.

In the coating device 70 of FIG. 4, an actuator 78 enables the spray gun 73 to move at a random speed from a random position in two directions within a plane, the two directions which are: that of an axis "X" parallel to an arrow "X"; and that of an axis "Y" perpendicular to the axis "X".

In FIG. 4, the manner in which the second water repellent agent is included in the conductive porous material 81 is illustrated. The conductive porous material 81 is placed below the spray gun 73, and the spray gun 73 moves while discharging the dispersion 72. Thus, the second water repellent agent is included in the conductive porous material 81. The area on the conductive porous material 81 for applying the dispersion 72 can be adjusted by using a mask 79.

As mentioned above, in the coating device 70, the spray gun 73 can discharge the dispersion 72 while moving to a random position. That is, the amount of the second water repellent agent can be changed at an intended position in the conductive porous material 81. Thus, by using the coating device 70, the content of the second water repellent agent included in the substrate layer can be made lower at the downstream side than at the upstream side of the fuel flow.

The porosity of the substrate layer can be controlled by, for example: the discharged amount of the dispersion; the pressure and the flow amount of the jet of gas; the surface temperature of the substrate layer; and the like.

Alternatively, when the substrate layer includes the conductive porous material and the second conductive agent, the content of the second conductive agent is made lower at the downstream side than at the upstream side of the fuel flow. Due to this, the porosity of the substrate layer can be made higher at the downstream side than at the upstream side, while degradation in electronic conductivity is suppressed, and thus, fuel diffusivity can be controlled effectively.

The content of the second conductive agent in the entire substrate layer is preferably 5 to 50 wt %. If the content of the second conductive layer is less than 5 wt %, fuel diffusivity may not be sufficiently controlled. If the content of the second conductive agent exceeds 50 wt %, the porosity of the entire substrate layer may decrease. The content of the second conductive agent is preferably 25 to 60 wt % at the upstream side and preferably 0 to 20 wt % at the downstream side of the fuel flow in the substrate layer.

When the second conductive agent is included in the substrate layer, the second water repellent agent is preferably further included in terms of enabling better control of fuel diffusivity. At this time, the content of the second water repellent agent in the substrate layer may be uniform, or be lower at the downstream side than at the upstream side of the fuel flow.

For the first conductive agent and the second conductive agent, for example, materials usually used in the fuel cell field can be used without particular limitation. Specifically, carbon powder materials such as carbon black and scale-like graphite; carbon fibers such as carbon nanotubes and carbon nanofibers; and the like can be given. For the second conductive agent, only one of the above may be used alone, or two or more of the above may be used in a combination. The first conductive agent and the second conductive agent may be of the same or be different.

In order to include the second conductive agent in the substrate layer, for example, a means to impregnate a dispersion liquid of the second conductive agent into a conductive porous material can be given, as with the case of the second water repellent agent. As a means for changing the content of the second conductive agent from upstream to downstream of the fuel flow, for example, the same means as the one exemplified for changing the content of the second water repellent agent can be used with no particular limitation.

Alternatively, a precursor of the second conductive agent may be impregnated into a conductive porous material. By subsequently baking the whole in an inert atmosphere and thus carbonizing the precursor, a substrate layer including the second conductive agent can be obtained. At this time, it is preferable to bake it, for example, at a temperature about 700 to 1500° C. For the inert atmosphere, for example, $N_2$, Ar, and He can be given. For the precursor of the second conductive agent, for example, organic materials such as pitches, a polyimide resin, and a phenolic resin can be given. The precursor of the second conductive agent may include an organic solvent for adjusting concentration and viscosity.

Even when the precursor of the second conductive agent is impregnated, there is no particular limitation to the means for changing the content of the second conductive agent from upstream to downstream of the fuel flow.

For the conductive porous material, materials usually used in the fuel cell field can be used without particular limitation. However, a material having excellent fuel and oxidant diffusivities as well as a high electronic conductivity is preferable. For example, conductive porous materials such as a carbon paper, a carbon cross, and a non-woven carbon fabric can be given. The thickness of the conductive porous material is preferably 100 to 500 µm, and more preferably 200 to 400 µm. The thickness of the conductive porous material is, for example, 5 to 20 times that of the conductive water repellent layer.

The conductive water repellent layer preferably includes 10 to 60 wt % of the first water repellent agent. The thickness of the conductive water repellent layer is preferably 10 to 80 µm, and more preferably 20 to 60 µm. If the thickness of the conductive water repellent layer is less than 10 µm, the bonding strength between the conductive water repellent layer and the catalyst layer may become insufficient. If the thickness of the conductive water repellent layer exceeds 80 µm, fuel diffusivity may become insufficient.

The conductive water repellent layer is formed on the surface of the substrate layer. The method for forming the conductive water repellent layer is not particularly limited. For example, the first conductive agent and the first water repellent agent are mixed and dispersed to prepare a conductive water repellent layer paste. The conductive water repellent layer paste is applied to one face of the substrate layer by a doctor blade method or a spray coating method and then dried, thus obtaining a conductive water repellent layer.

Methanol is preferable as fuel, and is preferably used in the form of an aqueous solution with a methanol concentration of 2 to 8 mol/L. The methanol concentration of the aqueous methanol solution is more preferably 3 to 5 mol/L. The higher the fuel concentration, the more the reduction in size and weight for the entire fuel cell system; however, there is a possibility of a higher MCO. Since MCO can be reduced according to the present invention, an aqueous methanol solution with a methanol concentration higher than usual can be used. If methanol concentration is less than 2 mol/L, the reduction in size and weight for the fuel cell system may become difficult. If the methanol concentration exceeds 8 mol/L, MCO may not be sufficiently reduced. By using fuel with the methanol concentration mentioned above, the supply amount of methanol can be further favorably secured at the downstream side of the fuel flow, while also reducing MCO at the upstream side thereof in the substrate layer.

For fuel other than the above, for example, ethanol, dimethyl ether, and the like can be given.

The direct oxidation fuel cell of the present invention can be characterized as using the anode diffusion layer mentioned above. There is no particular limitation to the other members of the constitution, and for example, a constitution same as that of a conventional fuel cell can be used. Also for the cathode diffusion layer, a substrate layer and a conductive water repellent layer same as those mentioned above can be used.

For the electrolyte membrane, for example, a conventionally-used proton-conductive polymer membrane can be used without particular limitation. Specifically, perfluorocarbon sulfonic acid-base polymer membranes, hydrocarbon-base polymer membranes, and the like can be preferably used. As examples of a perfluorocarbon sulfonic acid-base polymer membrane, Nafion®, Flemion®, and the like can be given. As examples of a hydrocarbon-base polymer membrane, sulfonated polyether ether ketone, sulfonated polyimide, and the like can be given. In particular, the use of the hydrocarbon-base polymer membrane enables the control of the formation of sulfonic acid group cluster structures and thus enables the reduction in methanol permeability of the electrolyte membrane. Due to this, MCO can be further reduced. The thickness of the electrolyte membrane is preferably 20 to 150 µm.

The catalyst layer preferably includes a catalyst, a catalyst carrier, and a polymer electrolyte. For the catalyst, a noble metal with a high catalytic activity is preferable. For an anode catalyst, an alloy catalyst of platinum and ruthenium is preferably used in terms of reducing catalyst poisoning caused by carbon monoxide. For a cathode catalyst, platinum is preferably used. The catalyst is preferably used in the manner of being carried on the carrier. For the carrier, a carbon material such as carbon black is preferably used, due to its high electronic conductivity and acid resistance. For the polymer electrolyte, a proton-conductive perfluorocarbon sulfonic acid-base polymer material is preferably used.

The method for producing the catalyst layer is not particularly limited. For example, a catalyst layer paste is prepared with water or alcohol as the diffusion medium. The catalyst layer paste is applied to a sheet composed of PTFE by using a doctor blade method, a spray coating device, and the like. Thus, the catalyst layer is obtained.

The anode-side separator and the cathode-side separator are not particularly limited. The anode-side separator has the fuel flow channel for supplying fuel to the anode. The cathode-side separator has the oxidant flow channel for supplying oxidant to the cathode. Forms of the fuel flow channel and the oxidant flow channel are not particularly limited. For example, types such as a serpentine-type and a parallel-type can be given.

EXAMPLES

Hereinafter, the present invention will be described specifically with reference to Examples. However, it should be noted that the present invention is not limited to the following Examples.

Example 1

(a) Preparation of Conductive Water Repellent Layer Paste

A conductive water repellent layer paste was prepared by dispersively mixing a first water repellent agent and a first conductive agent in an ion-exchanged water to which a surfactant was added. A PTFE dispersion containing PTFE (polytetrafluoroethylene) as the first water repellent agent with a PTFE content of 60 wt % (manufactured by Sigma-Aldrich Japan K.K.) was used. For the first conductive agent, acetylene black (Denka Black, manufactured by Denki Kagaku Kogyo Co., Ltd.) was used. The weight ratio of acetylene black to PTFE was 50:50.

(b) Production of Substrate Layer

A carbon paper (TGP-H-090 with a thickness of 280 μm, manufactured by Toray Industries, Inc.) was used for a conductive porous material constituting a substrate layer of an anode diffusion layer. The porosity of the substrate layer was changed in three steps, by using a PTFE dispersion containing PTFE (manufactured by Sigma-Aldrich Japan K.K.) as a second water repellent agent.

The substrate layer of 6 cm×6 cm was divided into three 6 cm×2 cm areas. These areas were an upstream portion, a midstream portion, and a downstream portion, respectively, of the fuel flow. The upstream portion and the midstream portion were masked; a PTFE dispersion with a 8 wt % PTFE content was dropped on the downstream portion so as to be impregnated therein; and then the whole was dried.

Next: the upstream portion and the downstream portion were masked; a PTFE dispersion with a 25 wt % PTFE content was dropped on the midstream portion so as to be impregnated therein; and then the whole was dried. Then: the midstream portion and the downstream portion were masked; a PTFE dispersion with a 43 wt % PTFE content was dropped on the upstream portion; and then the whole was dried. In each case, the surfactant was removed with the drying temperature set to 350° C., and thus, the substrate layer including the second water repellent agent was produced. The content of the second water repellent agent was 50 wt %, 31 wt %, and 11 wt % in the upstream portion, the midstream portion, and the downstream portion, respectively. In addition, the porosity of the substrate layer was 56%, 68%, and 77% at the upstream portion, the midstream portion, and the downstream portion, respectively. The porosity of the substrate layer was measured in the following manner. First, the weight was measured for each of: the substrate layer cut into three parts being the upstream portion, the midstream portion, and the downstream portion, respectively; and the conductive porous material prior to having the second water repellent agent impregnated therein. Then, from the weight and the apparent volume, the bulk density was obtained for each of the above.

Subsequently, the porosity was obtained by using the formula (1) mentioned above.

(c) Production of Anode Diffusion Layer and Cathode Diffusion Layer

The conductive water repellent layer paste of (a) was applied to one surface of the substrate layer produced in (b) for an anode and then dried, thus producing an anode diffusion layer. The thickness of the conductive water repellent layer at the anode side was about 40 μm.

In addition, the conductive water repellent layer paste of (b) was applied to one face of the substrate layer for a cathode and then dried, thus producing a cathode diffusion layer. A carbon paper (AvCarb® 1071HCB, manufactured by Ballard Material Products, Inc.) was used for the substrate layer. The thickness of the conductive water repellent layer at the cathode side was about 40 μm.

(d) Production of Cathode Catalyst Layer and Anode Catalyst Layer

Ketjen black (ECP, manufactured by Ketjen Black International Company) carrying a Pt catalyst was used for a cathode catalyst. The weight ratio of ketjen black to Pt was ketjen black:Pt=50:50. Mixed together were: a liquid composed of an aqueous isopropanol solution with the cathode catalyst dispersed therein; and a dispersion liquid of 5 wt % Nafion® (manufactured by Sigma-Aldrich Japan K.K.) as an electrolyte, thus producing a cathode catalyst layer paste.

In addition, ketjen black mentioned above carrying a Pt—Ru alloy catalyst (atomic ratio of Pt:Ru=1:1) was used for an anode catalyst. The weight ratio of ketjen black to the Pt—Ru alloy was ketjen black:Pt—Ru=50:50. Except for using the anode catalyst, an anode catalyst layer paste was prepared in the same manner as above.

The cathode catalyst layer paste and the anode catalyst layer paste were each applied onto a PTFE sheet and then dried, thus producing each of the cathode catalyst layer and the anode catalyst layer. The thickness of the cathode catalyst layer and the anode catalyst layer were about 50 μm each.

(e) Production of Membrane-Electrode Assembly (MEA)

The cathode catalyst layer and the anode catalyst layer were each bonded to each face of an electrolyte membrane by a hot pressing method, and the PTFE sheet was separated. Further, a cathode diffusion layer was bonded to the cathode catalyst layer, and an anode diffusion layer was bonded to the anode catalyst layer. Due to this, a membrane-electrolyte assembly (MEA) was produced. Nafion 112 (manufactured by E.I. Du Pont de Nemours & Co. Inc.) was used for the electrolyte membrane.

(f) Fabrication of Fuel Cell

A rubber gasket was disposed on each face of the electrolyte membrane exposed at the peripheral portion of the MEA. Then, the MEA was sandwiched between the anode-side separator and the cathode-side separator. The anode-side separator has a fuel flow channel for supplying fuel to the anode. The cathode-side separator has an oxidant flow channel for supplying oxidant to the cathode. A material made of carbon was used for each of the anode-side separator and the cathode-side separator. The fuel flow channel and the oxidant flow channel were each a serpentine-type flow channel. For the fuel flow channel: the channel width, depth, and length were 1 mm, 1 mm, and 150 cm, respectively. For the oxidant flow channel, the channel width, depth, and length were 1 mm, 1 mm, and 150 cm, respectively. Further, a current collecting plate, a heater, an insulating plate, and an end plate were stacked in this order from each side in a sandwiching manner, thus fabricating a direct oxidation fuel cell.

(g) Evaluation of Life Characteristics

Air was supplied to the cathode and an aqueous 4 mol/L methanol solution was supplied to the anode. Discharging was performed for 60 minutes with the load being a constant current of 150 mA/cm$^2$ using an electronic load device; and then there was a pause for 30 minutes. This was referred to as one cycle. The fuel cell was maintained at 60° C., the air utilization was 50%, and the fuel utilization was 70%.

500 cycles were performed for the operation mentioned above, and the rate of the average voltage at the 500$^{th}$ cycle with respect to the average voltage at the 1$^{st}$ cycle was obtained. The results are shown in Table 1.

Example 2

In producing a substrate layer, a dispersion liquid with a second conductive agent dispersed therein was impregnated into three areas of a carbon paper, by using the same method as the one in Example 1 for impregnating the second water repellent agent. An ion-exchanged water to which a surfactant was added was used for the dispersion medium, and acetylene black was used for the second conductive agent. The solid content of acetylene black in the dispersion liquid was 6 wt % and 2 wt % at the upstream portion and the midstream portion, respectively. The second conductive agent was not impregnated into the downstream portion. The content of the second conductive agent in the substrate layer was 38 wt % and 19 wt % at the upstream portion and the midstream portion, respectively.

On the entire face of the obtained substrate layer, a PTFE dispersion with a PTFE content adjusted to 8 wt % was dropped as a second water repellent agent so as to be impregnated therein, and then the whole was dried. The content of the second water repellent agent in the entire substrate layer was 12 wt %. The porosity of the substrate layer was 59%, 70%, and 76% at the upstream portion, the midstream portion, and the downstream portion, respectively.

A direct oxidation fuel cell was fabricated in the same manner as Example 1, except for producing an anode diffusion layer by using the substrate layer obtained above.

Life characteristics were evaluated for the fabricated fuel cell in the same manner as Example 1. The results are shown in Table 1.

Example 3

A substrate layer of an anode diffusion layer was produced in the same manner as Example 1.

On the substrate layer, conductive water repellent layers each differing in composition were formed at the upstream portion, the midstream portion, and the downstream portion of the fuel flow, respectively, in the following manner. The upstream portion and the midstream portion were masked; a conductive water repellent layer paste, in which the weight ratio of acetylene black to PTFE was 70:30, was applied to the downstream portion by a doctor blade method: and then the whole was dried. In the same manner, a conductive water repellent layer, in which the weight ratio of acetylene black to PTFE was 50:50, was formed at the midstream portion. At the upstream portion, a conductive water repellent layer, in which the weight ratio of acetylene black to PTFE was 30:70, was formed. These conductive water repellent layer had a thickness of 40 μm each.

A direct oxidation fuel cell was fabricated in the same manner as Example 1, except for using the anode diffusion layer obtained above.

Life characteristics were evaluated for the fabricated fuel cell in the same manner as Example 1. The results are shown in Table 1.

Example 4

A direct oxidation fuel cell was fabricated in the same manner as Example 1.

Life characteristics were evaluated in the same manner as Example 1, except for making the concentration 1 mol/L for an aqueous methanol solution supplied to the fabricated fuel cell. The results are shown in Table 1.

Example 5

A direct oxidation fuel cell was fabricated in the same manner as Example 1.

Life characteristics were evaluated in the same manner as Example 1, except for making the concentration 8 mol/L for an aqueous methanol solution supplied to the fabricated fuel cell. The results are shown in Table 1.

Comparative Example 1

On the entire face of a carbon paper (a conductive porous material) same as the one used for the anode diffusion layer in Example 1, a PTFE dispersion including 8 wt % of PTFE as a second water repellent agent was dropped so as to be impregnated therein, and then, the whole was dried. The content of the second water repellent agent in the entire substrate layer was 12 wt % and the porosity of the substrate layer was 77%.

A direct oxidation fuel cell was fabricated in the same manner as Example 1, except for producing an anode diffusion layer using the substrate layer obtained above.

Life characteristics were evaluated for the fabricated fuel cell in the same manner as Example 1. The results are shown in Table 1.

Comparative Example 2

A conductive water repellent layer was formed in the same manner as Example 3 on the substrate layer including a second water repellent agent produced in the same manner as Comparative Example 1, and thus an anode diffusion layer was obtained.

A direct oxidation fuel cell was fabricated in the same manner as Example 1, except for using the anode diffusion layer mentioned above.

Life characteristics were evaluated for the fabricated battery in the same manner as Example 1. The results are shown in Table 1.

Comparative Example 3

A direct oxidation fuel cell was fabricated in the same manner as Comparative Example 2.

Life characteristics were evaluated in the same manner as Example 1, except for making the concentration mol/L for an aqueous methanol solution supplied to the fabricated battery. The results are shown in Table 1.

TABLE 1

| | Porosity of Substrate Layer (%) | | | Porosity Control Means | Composition of Conductive Water Repellent Layer | Methanol Concentration (mol/L) | Life Characteristics Output Retention Rate |
|---|---|---|---|---|---|---|---|
| | Upstream | Midstream | Downstream | | | | |
| Ex. 1 | 56 | 68 | 77 | Water Repellent Agent | Uniform | 4 | 96% |
| Ex. 2 | 59 | 70 | 76 | Conductive Material | | | 95% |
| Ex. 3 | 56 | 68 | 77 | Water Repellent Agent | Not Uniform | | 91% |
| Ex. 4 | 56 | 68 | 77 | | Uniform | 1 | 95% |
| Ex. 5 | 56 | 68 | 77 | | | 8 | 89% |
| Comp. Ex. 1 | | 77 | | — | Uniform | 4 | 62% |
| Comp. Ex. 2 | | 77 | | | Not Uniform | | 73% |
| Comp. Ex. 3 | | 77 | | | | 1 | 86% |

With respect to the fuel cells of Examples 1 to 5 in which the porosity of the substrate layer of the anode diffusion layer was made higher at the downstream side than at the upstream side of the fuel flow, each exhibited significantly improved life characteristics compared to the fuel cell of Comparative Example 1 that used a substrate layer with uniform porosity. It is considered that life characteristics improved, since MCO was reduced and output power degradation was suppressed at the upstream side of the fuel flow, and the supply amount of methanol was sufficiently secured at the downstream side thereof.

In Examples 1 and 2, the composition of the conductive water repellent layer was made uniform from the upstream side toward the downstream side of the fuel flow. In Example 3 on the other hand, the composition of the conductive water repellent layer was not made uniform from the upstream side toward the downstream side of the fuel flow. The fuel cells of Examples 1 and 2 exhibited further improvement in life characteristics than the fuel cell of Example 3. It is considered that, by making the composition of the conductive water repellent layer uniform from the upstream side toward the downstream side of the fuel flow, the bonding strength became favorable at the interface between the conductive water repellent layer and the catalyst layer, thus enabling further improvement in life characteristics. Favorable life characteristics were also achieved in Example 5 in which a highly-concentrated 8 mol/L methanol was used, and it can be seen that the present invention is also extremely effective with respect to high concentration methanol. The use of high concentration methanol enables the fuel cell system to be further reduced in size.

In Comparative Example 1, the porosity of the substrate layer and the composition of the conductive water repellent layer were each made uniform. In Comparative Examples 2 and 3, a substrate layer with uniform porosity was used, and the composition of the conductive water repellent layer was not made uniform at the upstream side and the downstream side of the fuel flow. Compared to the fuel cell of Comparative Example 1, the fuel cells of Comparative Examples 2 and 3 had life characteristics that were slightly improved. However, the effect of improving life characteristics was extremely small in the fuel cells of Comparative Examples 2 and 3, compared to the fuel cells of Examples 1 to 5 in which the porosity of the substrate layer was made higher at the downstream side than at the upstream side of the fuel flow. Since the conductive water repellent layer is extremely thin compared to the substrate layer, it is considered that the effect of reducing MCO was unable to be sufficiently achieved by merely making the composition of the conductive water repellent layer non-uniform at the upstream side and the downstream side of the fuel flow.

The fuel cell of Comparative Example 2 with fuel high in methanol concentration exhibited more degradation in life characteristics compared to Comparative Example 3 with fuel lower in methanol concentration. That is, it was confirmed that only optimizing the conductive water repellent layer while leaving the porosity of the substrate layer unoptimized resulted in small effect for improving life characteristics with the use of high concentration methanol.

From the above, it was found that a direct oxidation fuel cell with improved long life characteristics can be obtained according to the present invention.

A direct oxidation fuel cell of the present invention has excellent long life characteristics even when using a highly-concentrated aqueous methanol solution, and thus, reduction in size is possible for the fuel cell system. Thus, the direct oxidation fuel cell of the present invention is extremely useful as a power source for compact devices such as cell phones and laptop computers.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A direct oxidation fuel cell comprising:
   a membrane electrode assembly including an anode, a cathode, and an electrolyte membrane interposed between said anode and said cathode;
   an anode-side separator having a fuel flow channel for supplying fuel to said anode; and
   a cathode-side separator having an oxidant flow channel for supplying oxidant to said cathode, wherein said anode includes an anode catalyst layer disposed at the side of said electrolyte membrane and an anode diffusion layer disposed at the side of said anode-side separator, said anode diffusion layer includes: a conductive water repellent layer disposed at the side of said anode catalyst layer and including a first conductive agent and a first water repellent agent; and a substrate layer disposed at the side of said anode-side separator, said conductive water repellent layer is disposed between said substrate layer and said anode catalyst layer, and said substrate layer includes a conductive porous material and a second water repellent agent, the content of said second water repellent agent included in said substrate layer being lower at the downstream side than at the upstream side of the fuel flow, whereby the porosity of said substrate layer is higher at the downstream side than at the upstream side of the fuel flow.

2. The direct oxidation fuel cell in accordance with claim 1, wherein said substrate layer includes a second conductive agent; and the content of said second conductive agent included in said substrate layer is lower at the downstream side than at the upstream side of the fuel flow.

3. The direct oxidation fuel cell in accordance with claim 1, wherein the porosity of said substrate layer gradually becomes higher from the upstream side toward the downstream side of the fuel flow.

4. The direct oxidation fuel cell in accordance with claim 1, wherein the composition and the thickness of said conductive water repellent layer are entirely uniform from the upstream side to the downstream side of the fuel flow.

5. The direct oxidation fuel cell in accordance with claim 1, wherein said fuel is methanol, and an aqueous methanol solution with a methanol concentration of 2 mol/L to 8 mol/L passes through said fuel flow channel.

6. The direct oxidation fuel cell in accordance with claim 1, wherein the porosity at the downstream side of said substrate layer is 1.2 to 2 times more than the porosity at the upstream side.

7. The direct oxidation fuel cell in accordance with claim 1, wherein the thickness of said substrate layer is 5 to 20 times more than the thickness of said conductive water repellent layer.

8. The direct oxidation fuel cell in accordance with claim 1, wherein the porosity at the upstream side of said substrate layer is 35 to 65%, and the porosity at the downstream side is 70 to 85%.

9. The direct oxidation fuel cell in accordance with claim 1, wherein the porosity of said substrate layer changes in a direction of the fuel flow.

10. The direct oxidation fuel cell in accordance with claim 9, wherein the porosity of said substrate layer changes in a direction of the entire fuel flow.

11. The direct oxidation fuel cell in accordance with claim 9, wherein the porosity of said substrate layer changes in a direction of a local fuel flow.

12. The direct oxidation fuel cell in accordance with claim 1, wherein the porosity of said substrate layer changes in a direction normal to a thickness direction of said substrate layer.

* * * * *